United States Patent [19]

Chmelir et al.

[11] 4,297,468
[45] Oct. 27, 1981

[54] ALLYL AMIDO PHOSPHOROUS COPOLYMERS

[75] Inventors: Miroslay Chmelir, Krefeld; Kurt Dahmen, Monchengladbach, both of Fed. Rep. of Germany

[73] Assignee: Chemische Fabrik Stockhausen & Cie, Krefeld, Fed. Rep. of Germany

[21] Appl. No.: 39,614

[22] Filed: May 16, 1979

[30] Foreign Application Priority Data

May 23, 1978 [DE] Fed. Rep. of Germany ....... 2822423

[51] Int. Cl.³ .......................................... C08F 230/02
[52] U.S. Cl. .............................. 526/276; 260/29.6 H; 260/29.6 TA; 525/329; 526/261; 526/278; 526/317
[58] Field of Search ........................................ 526/276

[56] References Cited

U.S. PATENT DOCUMENTS

| 2,574,516 | 11/1951 | Walter et al. | 526/276 |
| 2,798,053 | 7/1957 | Brown | 260/29.6 E |
| 2,912,439 | 11/1959 | Haser et al. | 526/266 |
| 2,958,679 | 11/1960 | Jones | 526/256 |
| 2,985,625 | 5/1961 | Jones | 526/261 |
| 2,985,631 | 5/1961 | Jones et al. | 526/227 |
| 3,032,538 | 5/1962 | Spaulding et al. | 526/216 |
| 3,066,118 | 11/1962 | Jones | 526/261 |

*Primary Examiner*—Stanford M. Levin
*Attorney, Agent, or Firm*—Sprung, Felfe, Horn, Lynch & Kramer

[57] ABSTRACT

The invention relates to new cross-linked copolymers containing carboxyl groups and especially useful as thickening agents for aqueous and organic solvents, which copolymers contain (A) 20 to 100% by weight of olefinically unsaturated carboxylic acids,
(B) 0 to 80% by weight of at least one mono-olefinically unsaturated monomer copolymerizable with the components A and C, and
(C) 0.1 to 4% by weight, calculated on the total quantity of monomers, of allyl monomer of the general formula

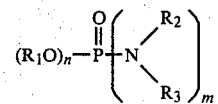

in which
n=0, 1 or 2,
m=1, 2 or 3, wherein n+m=3,
$R_1$ = hydrogen, or an alkyl, alkoxyalkyl, haloalkyl, cycloalkyl, aryl, alkaryl, aralkyl or alkenyl radical, and
$R_2$ and $R_3$, which may be the same or different, each represents hydrogen or an allyl, alkyl, cycloalkyl, aryl, aralkyl or alkaryl radical, wherein at least two of the radicals $R_1$, $R_2$ and $R_3$ must be an allyl radical or a substituted allyl radical.

9 Claims, No Drawings

ALLYL AMIDO PHOSPHOROUS COPOLYMERS

Water-swellable synthetic polymers have a great variety of uses as thickening agents in the textile, paper, foodstuffs, mineral oil and pharmaceutical industry and in cosmetics. These products are maleic acid anhydride/ethylene copolymers or acrylic acid or methacrylic acid polymers.

The thickening effect of such products is achieved by cross-linking, and various polyfunctional compounds, which are described in numerous patent specifications, are used as cross-linking agents in concentrations of 0.1 to 10%. The following, for example, are used as cross-linking agents:

| | | |
|---|---|---|
| methylene bisacrylamide | GB Patent | 800 011 |
| | U.S. Pat. No. | 2 985 625 |
| | DAS | 1 138 225 |
| | DAS | 1 103 585 |
| butanediol diacrylate, divinyl benzene | | |
| divinyl sulphone, maleic acid diallyl ester | DAS | 138 225 |
| polyallyl sucroses | U.S. Pat. No. | 2 798 053 |
| divinyl dioxan | U.S. Pat. No. | 2 912 439 |
| | DAS | 2 017 451 |
| allyl group-containing acrylates | DAS | 2 214 945 |
| triallyl cyanurate | FR Patent | 2 281 389 |
| | U.S. Pat. No. | 3 066 118 |
| | DAS | 2 534 792 |
| | DAS | 1 103 585 |
| polyallyl ethers, trimethacryloyl triazine | GB Patent | 800 011 |
| | U.S. Pat. No. | 2 985 625 |
| tetravinyl silane or tetraallyl silane and corresponding tin or germanium compounds | U.S. Pat. No. | 2 985 631 |
| hexaallyl- and hexamethallyl-trimethylenesulphone | | |
| | U.S. Pat. No. | 2 985 625 |
| | U.S. Pat. No. | 2 958 679 |
| | GB Patent | 800 011 |
| triallyl amine and tetraallyl ethylenediamine | | |
| | U.S. Pat. No. | 3 032 538 |
| or allyl esters of phosphoric or phosphorous acid | | |
| | DAS | 1 595 727. |

All of the products recommended as thickening agents produced using the above-listed cross-linking agents result after neutralization in slightly viscous to highly viscous gels if the concentration in which these products are used is high enough.

If used in a concentration of 0.1%, however, the thickening action of these products is weak, so they are not very suitable, for example, for the manufacture of printing pastes, in which the solids content must be very low in order to achieve high-quality prints. Furthermore their resistance to hydrolysis especially at high temperatures, is not adequate, so the losses in viscosity are considerable if the printing pastes are stored for several hours.

The problem underlying the invention was therefore to develop a thickening agent that is effective from a concentration of 0.1% by weight and that furthermore has adequate resistance to hydrolysis.

It has now been found that cross-linked polycarboxylic acids having a high thickening action may advantageously be produced by copolymerising olefinically unsaturated polymerisable carboxylic acids with 0.1 to 4, preferably 0.8 to 2.0, % by weight (calculated on the total quantity of monomers) of allyl amidophosphorus compounds having a cross-linking action.

The polyfunctional allyl compounds having a cross-linking action used are those of the general formula

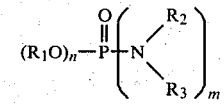

in which
n = 0, 1 or 2
m = 1, 2 or 3, wherein n + m = 3,
$R_1$ = hydrogen or an alkyl, alkoxyalkyl, haloalkyl, cycloalkyl, aryl, alkaryl, aralkyl or alkenyl radical, and
$R_2$ and $R_3$ may be the same or different and each represents hydrogen or an allyl, alkyl, cycloalkyl, aryl, aralkyl or alkaryl radical,
wherein at least two of the radicals $R_1$, $R_2$ and $R_3$ must be an allyl radical or a substituted allyl radical.

When $R_1$ is an alkyl radical, it preferably contains 1 to 6 carbon atoms. The alkyl radical may be straight-chain or branched. Especially suitable are lower alkyl radicals having 1 to 4 carbon atoms.

Examples of alkyl radicals are the methyl, ethyl, propyl, n-butyl, n-pentyl and n-hexyl radical and the corresponding branched alkyl radicals, such as the isopropyl radical and the various branched butyl, pentyl, and hexyl radicals. When $R_1$ represents an alkoxyalkyl radical, the alkyl moiety of the alkoxyalkyl radical preferably contains 2 to 6 carbon atoms and the alkoxy moiety of the alkoxyalkyl radical 1 to 6 carbon atoms, so that the alkoxyalkyl radical contains a total of 3 to 12 carbon atoms. Examples of the alkoxy moiety of the alkoxyalkyl radical are the methoxy radical, the ethoxy radical, the n- and isopropoxy as well as the n-butoxy radical. The alkyl moiety of the alkoxyalkyl radical is advantageously again a straight-chain or branched alkylene radical having 2 to 6 carbon atoms, lower alkylene radicals having 2 to 4 carbon atoms again being preferred. Examples of the alkylene moiety within the alkoxyalkyl radical are ethylene, 1,3- or 1,2-propylene and 1,2-, 1,3- or 1,4-butylene. When $R_1$ represents a haloalkyl radical, it again preferably contains 1 to 6 carbon atoms and is either straight-chain or branched. The haloalkyl radical may contain fluorine, chlorine or bromine as the halogen. Again preferred are lower haloalkyl radicals having 1 to 4 carbon atoms. The haloalkyl radical may be an alkyl radical substituted by one or more halogen atoms. Suitable haloalkyl radicals are, for example, chloromethyl, chloroethyl, n-chloropropyl, isochloropropyl, n-chlorobutyl, 2-chlorobutyl or 3-chlorobutyl radicals and the corresponding bromoalkyl radicals. The 1,2-dichloropropyl or dibromopropyl radical may be mentioned as examples of radicals containing more than one halogen substituent. When $R_1$ represents a cycloalkyl radical, this is preferably a ring containing 5 or 6 carbon atoms and thus represents the cyclopentyl or cyclohexyl radical. A preferred aryl radical $R_1$ is the phenyl radical. When $R_1$ represents an alkaryl radical, the alkyl moiety of the phenyl radical preferably contains 1 to 12 carbon atoms and is either straight-chain or branched. Examples of aralkyl radicals are the octylphenyl, nonylphenyl and dodecylphenyl radicals. When $R_1$ represents an aralkyl radical, this is preferably a benzyl radical or a phenethyl, phenylpropyl or phenylbutyl radical. The alkenyl radicals that $R_1$ may represent are especially lower alkenyl radicals having 3 to 6 carbon atoms. Examples are the allyl radical and the higher alkenyl radicals such as butenyl, pentenyl and hexenyl radicals.

When $R_2$ and $R_3$ represent alkyl radicals, they preferably contain 1 to 18 carbon atoms and may be straight-chain or branched, branched alkyl radicals being preferred. Especially preferred are alkyl radicals having a chain length of 1 to 6 carbon atoms. Suitable alkyl radicals are, for example, the methyl, ethyl, propyl and butyl radicals. The carbon chain may instead be interrupted by hetero atoms, such as in the case, for example, of alkoxyalkyl compounds, for example the 2-methoxyethyl and 3-methoxypropyl radical.

Suitable as cycloalkyl radicals are both isocyclic and heterocyclic radicals having 5 to 7 ring members, for example the cyclopentyl and cyclohexyl radical. Examples of cycloalkyl radicals interrupted by hetero atoms are the morpholine and piperidine radical. An example of an aryl radical is the phenyl radical, and of an aralkyl radical the benzyl radical or phenethyl radical, whereas preferred alkaryl radicals are alkylphenyl radicals having 1 to 6 carbon atoms in the alkyl group. Such alkylphenyl radicals are, for example, the toluidyl or o-, m- or p-xylyl radical. The alkyl group may again be branched or straight-chain. Examples of such allylphosphoramido compounds are phosphoric acid ethyl ester (N,N'-diallyl)diamide, phosphoric acid ethyl ester (N,N,N',N'-tetraallyl)diamide or phosphoric acid (hexaallyl)triamide, wherein phosphoric acid ethyl ester (tetraallyl)diamide is preferred as cross-linking agent.

Suitable olefinically unsaturated carboxylic acids are acrylic and methacrylic acid, preferably acrylic acid. They may also be polymerized in admixture with other polymerizable mono-olefinically unsaturated comonomers in the presence of the cross-linking agent, but at least 20% by weight of the olefinically unsaturated polymerizable carboxylic acids must be present in the mixture, whereas the other monoolefinically unsaturated comonomers are present in the mixture in a quantity of 0–80%. Examples of such copolymerizable comonomers are acrylic acid amide, methacrylic acid amide, N-alkylacrylamides, styrene, acrylonitrile, ethyl acrylate, stearyl methacrylate, vinyl acetate, vinyl pyridines, vinyl ethers, etc. The comonomers copolymerizable with acrylic acid that are preferred are alkyl acrylates, alkyl methacrylates or vinyl acetate, wherein the alkyl radicals in the alkyl acrylates and alkyl methacrylates are preferably lower alkyl radicals having 1 to 4 carbon atoms. Examples of these are the methyl, ethyl, n-propyl and n-butyl acrylates and methacrylates.

The invention accordingly provides cross-linked carboxylic copolymers which are characterized in that they contain
(A) 20 to 100% of olefinically unsaturated carboxylic acids,
(B) 0 to 80% by weight of at least one monoolefinically unsaturated monomer copolymerisable with the components A and C, and
(C) 0.1 to 4% by weight, calculated on the total quantity of monomers, of allyl monomer of the general formula

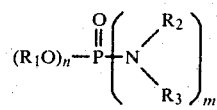

in which
n = 0, 1 or 2,
m = 1, 2 or 3, wherein n + m = 3,
$R_1$ = hydrogen, or an alkyl, alkoxyalkyl, haloalkyl, cycloalkyl, aryl, alkaryl, aralkyl or alkenyl radical, and
$R_2$ and $R_3$, which may be the same or different, each represents hydrogen or an allyl, alkyl, cycloalkyl, aryl, aralkyl or alkaryl radical,
wherein at least two of the radicals $R_1$, $R_2$ and $R_3$ must be an allyl radical or a substituted allyl radical.

The polymerization may be carried out in an organic solvent in which the monomers are soluble but in which the copolymer is insoluble. In this manner the polymer is obtained in the form of a fine powder which merely requires removal of the solvent. The solvent must be inert towards the monomers and the copolymer. It is preferably an aromatic or aliphatic hydrocarbon, but any other solvent that meets the above requirements can be used. Suitable solvents include, for example, benzene, toluene, liquid paraffins, and fluorinated or chlorinated hydrocarbons (trichloroethane, trifluoroethane, tetrachloroethylene) etc. Much preferred as solvent is benzene or toluene.

The concentration of monomers in the solvent is 5 to 20%, preferably 8 to 12%, so that after polymerization a fine powder without agglomerates is obtained. With higher monomer concentrations the reaction is very exothermic, so that the desired polymerization temperature is difficult to maintain.

The polymerization can be carried out at a temperature within the range of from 0° to 100° C. Preferred temperatures lie in the range of 40° to 90° C., a range of 65° to 90° C. being especially preferred.

According to the process of the invention the reaction time at 72° C. is 2 or 4 hours with a 65 or 95% conversion respectively. At 90° C., conversions of 92 to 94% are obtained after two hours.

An organo-soluble radical-forming catalyst is necessary for the polymerization. Suitable catalysts include benzoyl peroxide, caprylic peroxide, acetyl peroxide, acetylbenzoyl peroxide, di-tert.-butyl peroxide, azoisobutyronitrile, dimethyl azoisobutyrate and many others. Also mixtures of such catalysts are suitable in the polymerization process of the present invention.

After neutralization with a base, the copolymers according to the invention result in clear, hydrolysis-resistant gels which, depending on the quantity of water used, range between pourable and slump-resistant. The thickening in water is achieved by neutralization of the COOH groups of the copolymer, the optimal thickening effect usually being at a pH value of 6.5 to 9. It is therefore advantageous to neutralize the copolymer to a pH value of approximately 7 while it is dissolved or dispersed in the aqueous phase. The bases used for the purpose of neutralization are generally sodium hydroxide, potassium hydroxide, sodium or potassium carbonates, ammonia or mixtures of these different bases. It is also possible to use primary, secondary or tertiary amines. Thickening is generally achieved even if only some of the free COOH groups are neutralized and converted into alkali metal or ammonium salts.

To thicken a medium, either an aqueous dispersion of the copolymer according to the invention can be produced which, before introduction into the medium to be thickened, is adjusted to a pH value of approximately 7, or a dispersion of the copolymer according to the invention can be produced directly in the medium to be thickened and then neutralized with a suitable base.

When used in a concentration of 0.1% the products according to the invention result, after neutralization with sodium hydroxide solution, in clear gels of a viscosity that is very much higher than that of products produced according to the State of the Art, as can be seen from Table 1.

Furthermore, the products according to the invention, in comparison with copolymers produced according to the State of the Art with other cross-linking agents, have a better resistance to hydrolysis, as can be seen from Table 2.

The resistance to hydrolysis in aqueous media can be even further increased by adding an electrolyte, as can be seen from Table 3. In this case, too, the resistance to hydrolysis of the products according to the invention is better, as can be seen from the comparative values in Table 4.

The amidophosphoric acid compounds used as cross-linking agents according to the invention are known. They can be produced according to methods known per se by:

1. condensing phosphoric acid diester monohalides or phosphoric acid monoester dihalides or phosphorus oxychloride with diallyl amine or alkyl allyl amine or monoallyl amine, or with mixtures of allyl amines and other amines that may contain the claimed radicals $R_2$ and $R_3$, in the presence of acid-binding agents, such as, for example, tertiary amines, sodium carbonate or sodium hydroxide solution, or by 2. reacting dialkyl phosphites or diaryl phosphites with diallyl amine or monoallyl amine, or with mixtures of allyl amines and other amines that may contain the claimed radicals $R_2$ and $R_3$, according to the Todt-reaction. (J. of Org. Chem. (1950), 15, 637; J. of Chem. Soc. (1945), 660; J. of Chem. Soc. (1947), 674).

Methods of manufacture are described, for example, in

1. G. M. Kosolapoff: Organophosphorus Compounds, Publishers: John Wiley & Sons, Inc. New York 1950, page 278 ff.
2. A. D. F. Toy and R. S. Copper: J. Amer. Chem. Soc. (1954) 76, 2191.
3. GB-Patent 1 429 531
4. Houben Weyl: Methoden der organischen Chemie, Georg Thieme Verlag, Stuttgart 1964, Vol. 12/2, page 453 ff.

TABLE 1

All Products were produced in accordance with the conditions specified in Examples 1 and 2

| Copolymer | cross-linking agent chemical composition | according to | concentration in % calculated on the monomers | Brookfield viscosity in Pa.s at 20 rev/min of a neutralized 0.1% aqueous solution |
|---|---|---|---|---|
| 1 | phosphoric acid ethyl ester (N,N,N',N'-tetraallyl)diamide | Application | 1.0 | 22.0 |
| 2 | phosphoric acid ethyl ester (N,N,N',N'-tetraallyl)diamide | Application | 1.5 | 15.0 |
| 3 | phosphoric acid ethyl ester (N,N'-diallyl)diamide | Application | 1.0 | 13.6 |
| 4 | divinyl benzene | DAS 1 138 225 | 2.0 | 2.6 |
| 5 | triallyl cyanurate | DAS 1 103 585 | 1.0 | 5.8 |
| 6 | triallyl cyanurate | DAS 1 103 585 | 2.0 | 5.1 |
| 7 | trimethylolpropane triacrylate | DAS 1 138 225 | 1.0 | 3.3 |
| 8 | trimethylolpropane triacrylate | DAS 1 138 225 | 2.0 | 5.7 |
| 9 | trimethylolpropane diallyl ether | DAS 1 103 585 | 1.0 | 13.0 (not completely soluble) |
| 10 | citric acid triallyl ester | | 0.5 | 1.6 |
| 11 | citric acid triallyl ester | | 1.0 | 5.0 |
| 12 | citric acid triallyl ester | | 1.0 | 1.4 |
| 13 | citric acid triallyl ester | | 2.0 | 3.2 |
| 14 | triallyl phosphate | DAS 1 595 727 | 1.0 | 10.5 |

TABLE 2

Resistance to hydrolysis of the 0.5% aqueous solution neutralized to pH of 7

| | Brookfield viscosity (Pa.s) at 20 rev/min as a function of the time at room temperature after | | | | |
|---|---|---|---|---|---|
| | 0 | 3 | 5 | 10 | 16 days |
| copolymer 1, produced according to Example 2 of this application (with 1% cross-linking agent) | 32.6 | 27.5 | 26.0 | 24.1 | 23.3 |
| copolymer 14, produced according to DAS 1 595 727 with 1% triallyl phosphate | 38.0 | 26.2 | 21.2 | 14.6 | 11.0 |
| copolymer 5 (with 1% triallyl cyanurate as cross-linking agent, see Table 1) | 7.6 | 6.7 | 5.8 | 5.1 | 3.5 |
| copolymer 11 (with 1% citric acid triallyl ester, see Table 1) | 16.5 | 14.8 | 13.2 | 10.2 | 6.6 |

| | Brookfield viscosity (Pa.s) at 20 rev/min as a function of the time at 50° C. after | | | | | |
|---|---|---|---|---|---|---|
| | 0 | 64 | 88 | 102 | 120 | 215 hrs |
| copolymer 1 | 32.6 | 21.1 | 20.3 | 19.7 | 19.0 | 16.2 |
| copolymer 14 | 38.0 | 8.7 | 8.4 | 8.5 | 8.3 | 8.2 |
| copolymer 5 | 7.6 | 6.0 | 5.7 | 5.6 | 5.4 | 4.7 |
| copolymer 11 | 16.5 | 14.3 | 13.7 | 13.2 | 13.2 | 11.9 |

| | Brookfield viscosity (Pa.s) at 20 rev/min as a function of the time at 80° C. after | | | | |
|---|---|---|---|---|---|
| | 0 | 2 | 18 | 33 | 50 hrs |
| copolymer 1 | 32.6 | 23.4 | 17.0 | 11.8 | 10.1 |
| copolymer 14 | 38.0 | 20.0 | 8.5 | 8.0 | 7.6 |
| copolymer 5 | 7.6 | 7.0 | 5.1 | 4.6 | 4.7 |

TABLE 2-continued

Resistance to hydrolysis of the 0.5% aqueous solution neutralized to pH of 7

| copolymer 11 | 16.5 | 15.6 | 13.0 | 9.9 | 7.6 |
|---|---|---|---|---|---|

TABLE 3

Resistance to hydrolysis of the neutralized 0.5% aqueous solution of copolymer 1 (produced according to Example 2 of this Application) with electrolyte addition

| | Brookfield viscosity (Pa.s) at 20 rev/min as a function of the time at room temperature | | | |
|---|---|---|---|---|
| | | | after 60 days | |
| addition of diammonium phosphate in % | initial viscosity (Pa.s) | after 21 days (Pa.s) | (Pa.s) | as a percentage of the initial viscosity |
| 0.0 | 32.6 | 23.0 | 21.9 | 67.2 |
| 0.1 | 20.4 | 18.2 | 16.7 | 81.9 |
| 0.25 | 11.5 | 10.9 | 9.8 | 85.2 |
| 0.55 | 5.5 | 5.5 | 5.5 | 100.0 |

TABLE 4

For the comparison : Resistance to hydrolysis of the neutralized 0.5% aqueous solution of copolymer 14 (produced according to DAS 1 595 727 with 1% triallyl phosphate as cross-linking agent) with electrolyte addition.

| | Brookfield viscosity (Pa.s) at 20 rev/min as a function of the time at room temperature | | |
|---|---|---|---|
| | initial | after 60 days | |
| addition of diammonium phosphate in % | viscosity (Pa.s) | (Pa.s) | as a percentage of the initial viscosity |
| 0.0 | 38.0 | 10.1 | 26.8 |
| 0.1 | 22.0 | 8.9 | 40.4 |
| 0.25 | 11.0 | 7.2 | 65.4 |
| 0.5 | 5.3 | 5.2 | 98.0 |

The polymers according to the invention can be used, for example, as thickening agents in textile printing pastes, for the production of various cosmetic and pharmaceutical preparations, for dressing ores, in fire-extinguishing agents or in the recovery of oil.

The polymers according to the invention can also be used for thickening aqueous solutions that contain relatively large quantities of an organic solvent (for example, methanol, ethanol, isopropanol, acetone, tetrahydrofuran, dioxan, formamide, ethylene glycol, glycerine) or mixtures thereof, and for thickening anhydrous glycerine, ethylene glycol, formamide or mixtures thereof with other organic solvents.

The following Examples illustrate the invention without, however, limiting it.

EXAMPLE 1

655 ml of benzene and 72 g of acrylic acid were placed in a polymerization vessel and heated to 70° C. At this temperature, 0.72 g of phosphoric acid ethyl ester (N,N'-diallyl)diamide and 0.35 g of benzoyl peroxide were added in succession. The copolymer was precipitated in the form of a white powder during the polymerization process. After a reaction time of two hours a conversion of 65% had been achieved. The reaction product was in the form of a slurry from which the solvent was removed by filtration.

Clear aqueous gels were produced by dissolving 0.1 g of the dried product in 100 ml of water and neutralizing to a pH value of 7 with 20% sodium hydroxide solution. The viscosity of this 0.1% solution was measured with the Brookfield viscometer at 20 rev/min. The Brookfield viscosity at 20 rev/min ($BV_{20}$) was 13.6 Pa.s.

EXAMPLE 2

Copolymerization of acrylic acid was carried out in accordance with the process described in Example 1, with phosphoric acid ethyl ester (N,N,N',N'-tetraallyl)diamide as cross-linking agent. The concentration of the cross-linking agent (in % by weight calculated on acrylic acid) and the Brookfield viscosity ($BV_{20}$) of the 0.1% aqueous solutions, neutralized to a pH of 7, are listed in the following Table:

Benzene was used as diluent

| Concentration of the cross-linking agent (%) | $BV_{20}$ of the 0.1% aqueous solution (Pa.s) neutralized to a pH of 7 |
|---|---|
| 0.8 | 5.1 |
| 1.0 | 22.0 |
| 1.5 | 15.0 |
| 2.0 | 9.1 |

EXAMPLE 3

The copolymerization of acrylic acid was carried out in accordance with the process described in Example 1 using phosphoric acid ethyl ester (N,N,N',N'-tetraallyl)diamide as cross-linking agent. The concentration of the cross-linking agent (in % by weight calculated on acrylic acid) and the Brookfield viscosity ($BV_{20}$) of the 0.1% aqueous solutions, neutralized to a pH of 7, are listed in the following Table. Toluene was used as diluent. After a reaction time of two hours at 90° C. conversions of 92 to 94% had been achieved.

| Concentration of the cross-linking agent (%) | $BV_{20}$ of a 0.1% aqueous solution (Pa.s) | $BV_{20}$ of a 1% aqueous solution (Pa.s) |
|---|---|---|
| 1.5 | 2.8 | 23.0 |
| 2.0 | 1.3 | 15.0 |

EXAMPLE 4

Acrylic acid was polymerized in benzene in accordance with the process described in Example 1 with 1% phosphoric acid (hexaallyl)triamide. The Brookfield viscosity $BV_{20}$ of the 1% aqueous solution of the dried product, neutralized to a pH of 7, was 6.0 Pa.s.

EXAMPLE 5

36 g of acrylic acid, 43 g of vinyl acetate and 0.8 g of phosphoric acid ethyl ester (tetraallyl)diamide were polymerized in 715 ml of toluene at 80° C. in accordance with the process described in Example 1, with benzoyl peroxide as catalyst. The Brookfield viscosity $BV_{20}$ of the 0.1% aqueous solution of the dried product, neutralized to a pH of 7, was 1.9 Pa.s.

EXAMPLE 6

In accordance with the process described in Example 1, 57.6 g of acrylic acid, 14.4 g of methacrylic acid stearyl ester and 0.72 g of phosphoric acid ethyl ester (tetraallyl)diamide were polymerized with 0.35 g of benzoyl peroxide as catalyst in 660 ml of benzene at 70° C. The copolymer was precipitated in the form of a white powder during the polymerization process. After a reaction time of two hours a conversion of 83% had been reached. The Brookfield viscosity (20 rev/min) of the 0.1% solution of the dried product, neutralized to a pH of 7, was 8.1 Pa.s.

EXAMPLE 7

In accordance with the process described in Example 1, acrylic acid was polymerized with phosphoric acid ethyl ester (tetraallyl)diamide and benzoyl peroxide as catalyst using various different solvents as diluents. The results are set out in the following Table:

| Solvent | Phosphoric acid ethyl ester di-(N,N-diallyl)amide, % by weight on acrylic acid | Brookfield viscosity (5 rev/min) of a 0.1% aqueous solution neutralised to a pH of 7 (Pa.s) |
|---|---|---|
| cyclohexane | 1.5 | 5.5 |
| cyclohexane | 1.0 | 11.0 |
| tetrachloroethylene | 1.5 | 5.8 |
| 1,1,1-trichloro-ethane | 1.0 | 10.2 |
| 1,1,1-trichloro-ethane | 0.5 | 30.0 |
| 1,1,1-trichloro-ethane | 0.2 | 10.0 |
| 1,1,1-trichloro-ethane | 0.1 | 4.8 |

EXAMPLE 8

The polymer produced in Example 2 was used to thicken aqueous solutions containing organic solvents. The polymer was used in the form of a neutralized 0.5% aqueous gel and mixed with a corresponding amount of an aqueous alcohol-containing or glycerine-containing solution, so that the final concentration of the thickening agent in the mixture was 0.25%. The thickening action is shown in the following Table as a function of the concentration of the organic solvents.

Brookfield viscosity at 20 rev/min of the aqueous solutions of organic solvents with the addition of 0.25% by weight of the copolymer according to the invention:

| Solvent | Content of solvent % | Water content % | Brookfield viscosity 20 rev/min Pa.s |
|---|---|---|---|
| methanol | 50 | 50 | 19.5 |
| ethanol | 50 | 50 | 16.4 |
| isopropanol | 50 | 50 | 7.0 |
| isopropanol | 25 | 75 | 27.4 |
| acetone | 50 | 50 | 18.8 |
| tetrahydrofuran | 50 | 50 | 2.2 |
| tetrahydrofuran | 25 | 75 | 22.8 |
| dioxan | 25 | 75 | 11.3 |
| formamide | 50 | 50 | 14.1 |
| ethylene glycol | 50 | 50 | 27.0 |
| glycerine | 50 | 50 | 34.5 |
| glycerine/ethanol mixture (1:1) | 50 | 50 | 28.8 |
| glycerine/isopropanol mixture (1:1) | 50 | 50 | 27.5 |
| ethanol/diethyl ether mixture (2:1) | 50 | 50 | 12.1 |
| water (for comparison) | 0 | 100 | 28.5 |

EXAMPLE 9

The copolymerization of acrylic acid was carried out in accordance with the process described in Example 1 using phosphoric acid ethoxyethyl ester (tetraallyl)diamide as cross-linking agent. The concentration of the cross-linking agent (in % by weight calculated on the acrylic acid) and the Brookfield viscosities ($BV_{20}$) of the 0.1% and 0.5% aqueous solutions, neutralized to a pH of 7, are listed in the following Table. After a reaction time of two hours conversions of 90 to 92% had been achieved.

| concentration of the cross-linking agent (%) | $BV_{20}$ of a 0.1% aqueous solution (Pa.s) | $BV_{20}$ of a 0.5% aqueous solution (Pa.s) |
|---|---|---|
| 1.0 | 9.3 | 14.9 |
| 1.5 | 11.0 | 53.0 |

EXAMPLE 10

The copolymerization of acrylic acid was carried out in accordance with the process described in Example 1 using phosphoric acid chloroethyl ester (tetraallyl)diamide as cross-linking agent. The concentration of the cross-linking agent (in % by weight calculated on the acrylic acid) and the Brookfield viscosities ($BV_{20}$) of the 0.1% and 0.5% aqueous solutions, neutralized to a pH of 7, are listed in the following Table. After a reaction time of two hours at 70° to 78° C. conversions of 92 to 94% had been achieved, the benzoyl peroxide concentration having been doubled in comparison with Example 1.

| concentration of the cross-linking agent (%) | $BV_{20}$ of a 0.1% aqueous solution (Pa.s) | $BV_{20}$ of a 0.5% aqueous solution (Pa.s) |
|---|---|---|
| 1.0 | 5.3 | 11.2 |
| 2.0 | 7.4 | 80.0 |

EXAMPLE 11

The copolymerization of acrylic acid was carried out in accordance with the process described in Example 1 using phosphoric acid ethyl ester (N,N-diallyl, N'-butyl)diamide as cross-linking agent. The concentration of the cross-linking agent (in % by weight calculated on the acrylic acid) and the Brookfield viscosities ($BV_{20}$) of the 0.1% and 0.5% aqueous solutions, neutralized to a pH of 7, are listed in the following Table. After a reaction time of two hours at 70° to 78° C., conversions of 89 to 90% has been achieved.

| concentration of the cross-linking agent (%) | $BV_{20}$ of a 0.1% aqueous solution (Pa.s) | $BV_{20}$ of a 0.5% aqueous solution (Pa.s) |
|---|---|---|
| 1.0 | 7.6 | 12.8 |
| 1.5 | 10.7 | 20.5 |

EXAMPLE 12

The copolymerization of acrylic acid was carried out in accordance with the process described in Example 1, using phosphoric acid isobutyl ester (tetraallyl)diamide as cross-linking agent. The concentration of the cross-linking agent (in % by weight calculated on the acrylic acid) and the Brookfield viscosities ($BV_{20}$) of the 0.1% and 0.5% aqueous solutions, neutralized to a pH of 7, are listed in the following Table. After a reaction time of 2 hours at 70° to 78° C. conversions of 90 to 92% had been achieved, the concentration of benzoyl peroxide having been doubled in comparison with Example 1.

| concentration of the cross-linking agent (%) | $BV_{20}$ of a 0.1% aqueous solution (Pa.s) | $BV_{20}$ of a 0.5% aqueous solution (Pa.s) |
|---|---|---|
| 1.0 | 5.8 | 8.0 |
| 2.0 | 12.8 | 57.0 |

EXAMPLE 13

The copolymerization of acrylic acid was carried out in accordance with the process described in Example 1 using phosphoric acid ethyl ester (N,N-diallyl,-N'-benzyl)diamide as cross-linking agent. The concentration of the cross-linking agent (in % by weight calculated on the acrylic acid) and the Brookfield viscosities ($BV_{20}$) of the 0.1% and 0.5% aqueous solutions, neutralized to a pH of 7, are listed in the following Table. After a reaction time of two hours at 70° to 78° C., conversions of 88 to 90% had been achieved.

| concentration of the cross-linking agent (%) | $BV_{20}$ of a 0.1% aqueous solution (Pa.s) | $BV_{20}$ of a 0.5% aqueous solution (Pa.s) |
|---|---|---|
| 1.0 | 6.1 | 12.3 |
| 2.0 | 8.0 | 29.4 |

EXAMPLE 14

Acrylic acid was polymerized in benzene with 2% phosphoric acid ethyl ester (N,N-diallyl, N'-phenyl)diamide in accordance with the process described in Example 1. The Brookfield viscosity (20 rev/min) of the 0.5% aqueous solution of the dried product, neutralized to a pH of 7 was 2.8 Pa.s.

EXAMPLE 15

Acrylic acid was polymerized in benzene with 2% phosphoric acid ethyl ester (N,N-diallyl, N'-oleyl)diamide in accordance with the process described in Example 1. The Brookfield viscosity (20 rev/min) of the 0.5% aqueous solution of the dried product, neutralized to a pH of 7, was 3.2 Pa.s.

EXAMPLE 16

The copolymerization of acrylic acid was carried out with 2% of phosphoric acid diethyl ether (N,N-diaallyl-)amide as cross-linking agent in accordance with the process described in Example 1. The Brookfield viscosity ($BV_{20}$) of the 0.1% and 0.5% aqueous solutions, neutralized to a pH of 7, was 2.0 Pa.s and 32.0 Pa.s respectively.

We claim:

1. A cross-linked copolymer consisting of polymerized units of
   (A) at least one olefinically unsaturated carboxylic acid,
   (B) at least one mono-olefinically unsaturated monomer in up to four times the weight of (A), and
   (C) 0.1 to 4% by weight of (A) plus (B) of at least one allyl monomer of the formula

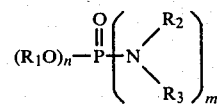

in which
n=0, 1 or 2,
m=1, 2 or 3,
n+m=3,
$R_1$=hydrogen, or an alkyl, alkoxyalkyl, haloalkyl, cycloalkyl, aryl, alkaryl, or alkenyl radical, and
$R_2$ and $R_3$ each independently is hydrogen or an allyl, alkyl, cycloalkyl, aryl, aralkyl or alkaryl radical,
at least two of the radicals $R_1$, $R_2$ and $R_3$ being an allyl radical or a substituted allyl radical.

2. A copolymer according to claim 1, wherein (A) comprises acrylic or methacrylic acid.

3. A copolymer according to claim 1, wherein (B) comprises an alkyl acrylate, stearyl methacrylate or vinyl acetate.

4. A copolymer according to claim 1, wherein (C) contains two or four to six allyl groups.

5. A copolymer according to claim 1, in which $R_1$ is a lower alkyl radical having 1 to 4 carbon atom, $R_2$ is hydrogen, $R_3$ is an allyl radical or a substituted allyl radical, n=1 and m=2.

6. A copolymer according to claim 1, in which $R_1$ is a lower alkyl radical having 1 to 4 carbon atoms, $R_2$ and $R_3$ each is an allyl radical or a substituted allyl radical, n=1, and m=2.

7. A copolymer according to claim 1, in which $R_2$ is hydrogen, an allyl radical or a substituted allyl radical, $R_3$ is an allyl radical or a substituted allyl radical, and m=3.

8. A copolymer according to claim 1, wherein (C) is phosphoric acid ethyl ester (N,N,N',N'-tetraallyl)diamide.

9. A copolymer according to claim 1, wherein (C) is phosphoric acid ethyl ester (N,N'-diallyl)diamide.

* * * * *

UNITED STATES PATENT AND TRADEMARK OFFICE
CERTIFICATE OF CORRECTION

PATENT NO. : 4,297,468
DATED : Oct. 27, 1981
INVENTOR(S) : Miroslav Chmelir et al It is certified that error appears in the above-identified patent and that said Letters Patent are hereby corrected as shown below:

Title Page Inventors    Delete "Miroslay" and insert --Miroslav--.

Signed and Sealed this

Sixth Day of April 1982

[SEAL]

Attest:

Attesting Officer

GERALD J. MOSSINGHOFF
Commissioner of Patents and Trademarks